(12) United States Patent
Guillot

(10) Patent No.: US 8,359,242 B2
(45) Date of Patent: Jan. 22, 2013

(54) METHOD FOR EXCHANGING DATA CONCERNING AN ELECTRONIC TRANSACTION

(75) Inventor: Carles Guillot, New York City, NY (US)

(73) Assignee: Sybase 368, Inc., Reston, VA (US)

(*) Notice: Subject to any disclaimer, the term of this patent is extended or adjusted under 35 U.S.C. 154(b) by 516 days.

(21) Appl. No.: 12/640,597

(22) Filed: Dec. 17, 2009

(65) Prior Publication Data
US 2010/0106622 A1 Apr. 29, 2010

Related U.S. Application Data

(63) Continuation of application No. 10/497,680, filed as application No. PCT/FR02/04125 on Dec. 2, 2002, now abandoned.

(30) Foreign Application Priority Data

Dec. 5, 2001 (FR) .................................. 01 15710

(51) Int. Cl.
 *G06Q 30/00* (2012.01)
(52) U.S. Cl. ................ 705/26.41; 705/26.44; 705/14.73
(58) Field of Classification Search ............... 705/14.73, 705/26.41, 26.44
See application file for complete search history.

(56) References Cited

U.S. PATENT DOCUMENTS

| 5,826,241 | A | * | 10/1998 | Stein et al. ................. 705/26.41 |
| 6,999,938 | B1 | | 2/2006 | Libman |
| 7,490,062 | B2 | | 2/2009 | Hansmann et al. |
| 8,234,184 | B2 | * | 7/2012 | Libman ........................ 705/26.7 |
| 2002/0077897 | A1 | | 6/2002 | Zellner et al. |
| 2003/0105659 | A1 | | 6/2003 | Eisenstein |

FOREIGN PATENT DOCUMENTS

| EP | 0822728 A2 | * | 2/1998 |
| WO | 9914711 | | 3/1999 |
| WO | WO-99/67938 A1 | * | 12/1999 |
| WO | 0077979 | | 12/2000 |
| WO | 0113298 | | 2/2001 |
| WO | 0171633 | | 9/2001 |

OTHER PUBLICATIONS

Anon., "'Pocket Internet' a Ground Breaker in Mobile Telephony," Irish Times, City Edition, p. 21, Oct. 30, 2000.*
Turner, M., "Olympic Weekly 315 Days Housing Big Push on for Rent Contracts," Atlanta Constitution, Olympic Weekly section, p. D/2, Sep. 8, 1995.
Quigley, P., "If Santa is Busy, His Mobile Can Take the Letter," Independent, Edition 3, Mobile Communications section, p. 17, Nov. 20, 1995.

* cited by examiner

*Primary Examiner* — Nicholas D Rosen
(74) *Attorney, Agent, or Firm* — Edell, Shapiro & Finnan, LLC

(57) ABSTRACT

A method for exchanging data concerning an electronic transaction between two entities, includes: a step which consists in determining and booking an origin address (TPOA) in conformity with a bidirectional mobile telephony (GSM) digital messaging service protocol (SMS); a step which consists in sending in accordance with the protocol (SMS), an offer message (OFFER_SMS) of the transaction (TR), the offer message (OFFER_SMS) being sent from the first entity (MW) and addressed to the second entity (CL); and a step which consists in sending, from the second entity (CL) and addressed to the first entity (MW), a reply message comprising an information (REP) representing acceptance or rejection of the transaction.

8 Claims, 2 Drawing Sheets

METHOD FOR EXCHANGING DATA CONCERNING AN ELECTRONIC TRANSACTION

This application is continuation of application Ser. No. 10/497,680, filed Oct. 15, 2004, which was filed as PCT/FR02/04125 on Dec. 2, 2002.

The present invention concerns a method of exchanging data relating to an electronic transaction.

To be more precise, the invention concerns a method of exchanging data that may be used for an electronic transaction between a financial establishment and a client, the client using a telecommunication apparatus connected to a mobile telecommunication network, for example the GSM network.

In this context, the user of the mobile equipment receives a transaction offer from the financial establishment by means of his mobile telephone, an offer that he may either accept or ignore.

The electronic transaction methods used on prior art mobile telecommunication networks necessitate the presence of a resident data processing program implemented in the mobile telephone of the user, this program being used firstly for authentication purposes and secondly for managing the sending of response messages that are useful for such transactions.

The necessity of implementing a resident program of this kind in the mobile telephones is a major constraint and limits the deployment of this kind of service.

The present invention aims to solve the problems previously cited, i.e. to make possible a method of carrying out an electronic transaction between a financial establishment and a mobile telephone user without it being necessary to implement a specific resident data processing program in the telephone, but instead using, as much as possible, the communication possibilities offered by the GSM network.

To be more precise, the invention is directed to a method of exchanging data relating to an electronic transaction between a first entity and a second entity, said transaction being identified by an identifier, which method is characterized in that it comprises:
- a step of determining and reserving an origin address conforming to a bidirectional digital mobile telephony messaging protocol, said determination being effected as a function of said identifier of said transaction and an identifier of said second entity;
- a step of sending a message in accordance with said protocol offering said transaction, said offer message being sent from said first entity to said second entity and containing said origin address reserved during said determination and reservation step; and
- in the event of explicit acceptance or refusal of said transaction, a step of sending from said second entity to said first entity a response message conforming to said protocol to said offer message, said response message containing information representative of acceptance or rejection of said transaction.

This protocol is preferably the SMS protocol defined by the GSM standard.

Accordingly, the method according to the invention of exchanging data enables an electronic transaction to be carried out using the possibilities offered by the SMS protocol defined by the GSM standard. To be more precise, the invention makes it possible to set up a communication channel dedicated to a transaction for a given second entity.

According to one particular feature of the transaction method according to the invention, the first entity is adapted to repeat the step of sending the offer message.

This feature has the advantage that it makes it possible to repeat the sending of the offer message, for example if the user's terminal is turned off or if the first entity is temporarily unable to allocate more SMS channels.

According to another particular feature, the transaction method according to the invention comprises, prior to said step of determining said origin address, a step of sending a message defining said transaction from a third entity to said first entity, said definition message containing said transaction identifier and an identifier of said second entity.

According to this preferred feature, the third entity, for example a financial establishment, sends a message defining the transaction to the first entity and has the latter send the transaction offer to the user of the mobile telephone whose number corresponds to that of the identifier contained in the definition message via the SMS network.

According to one particular feature, the origin address is further determined as a function of an identifier of the third entity.

Accordingly, the origin address inserted into the message offering the transaction defines unequivocally a given transaction between a third entity, for example a financial establishment, and a second entity, namely the user of a mobile telephone.

According to another particular feature of the transaction method according to the invention, the definition message further comprises a transaction validity period.

This particularly advantageous feature makes it possible to reserve the communication channel set up between the first entity and the second entity only for the validity period of the transaction.

According to one particular feature of this variant, the origin address is determined as a function of the validity period.

In the present patent application, the expression "validity period" is to be understood to refer either to a validity time period or to the expiry date of the validity of the transaction.

According to another particularly advantageous feature, the origin address is determined from a predetermined list known to the third entity and to the second entity.

For example, this predetermined list may have been communicated by the third entity to the second entity by any means, in particular by post or during an HTTPS session.

Accordingly, on receiving an offer message, the user of the mobile telephone may verify that the origin address is in the predetermined list, which makes the electronic transaction much more secure.

According to one particular feature of this variant, the origin address may be determined cyclically from the predetermined list.

For example, the origin address chosen from the list may be the available origin address that has not been retained for a time period or that which has been released for the longest time period.

According to another particular feature of the transaction method according to the invention, on reception of the response message, said first entity sends a response notification to said third entity, said response notification containing said information. Accordingly, the information representative of acceptance or rejection of the transaction by the user of the mobile telephone is sent to the third entity, for example to the financial establishment.

According to another particular feature, the data exchange method according to the invention comprises, prior to the step of sending the response message, a step of inserting a code representative of said second entity into said response message.

In practice, this code may be entered by means of the keypad of the mobile telephone and inserted into the response message sent in accordance with the SMS protocol.

According to a particular feature of this variant, this representative code is inserted into the response notification sent to the third entity, namely the financial establishment.

Accordingly, on receiving the response notification, the third entity may verify that the user of the mobile telephone who has responded to the transaction offer is an authorized person.

According to another particular feature of the data exchange method according to the invention, on reception of the response notification, the third entity sends an acknowledgement message to the first entity.

Among other things, this acknowledgement message allows the first entity to check that the response notification has actually been received by the third entity.

According to one particularly advantageous feature, if no response message is received during the validity period, the first entity sends a non-response notification message to the third entity.

Thus the third entity may assume that the user of the mobile telephone has decided not to respond to the transaction offer made to him by the third entity, namely the financial establishment.

According to another particularly advantageous feature of the data exchange method according to the invention, on reception of the acknowledgement message the first entity releases the origin address reserved during the obtaining and reservation step.

Accordingly, once the third entity has received the response or non-response notification, the communication channel of the SMS network dedicated to the transaction is released and may be used for another transaction.

Alternatively, on reception of the acknowledgement message, the first entity retains the origin address in order to allow the transaction to continue.

In particular, this advantageous feature allows the third entity to send a notification to the second entity via the intermediary first entity if the code representative of the user of the second entity is incorrect.

In a correlative manner, the invention provides a device for exchanging data relating to an electronic transaction with a second entity, said transaction being identified by an identifier, characterized in that it comprises:
  means for determining and reserving an origin address conforming to a bidirectional digital mobile telephony messaging protocol, said determination being effected as a function of said identifier of said transaction and an identifier of said second entity;
  means for sending a message in accordance with said protocol offering said transaction, said offer message being sent to said second entity and containing said origin address reserved during said determination and reservation step; and
  means for receiving, from said second entity, a response message conforming to said protocol and responding to said offer message, said response message comprising information representative of acceptance or rejection of said transaction.

The advantages of this device being identical to those of the method as briefly explained hereinabove, they are not restated here.

Other aspects and advantages of the present invention will become more clearly apparent on reading the following description of one particular embodiment, this description being given by way of non limiting example and with reference to the appended drawings, in which:

FIG. 1 represents the various entities used to implement the data exchange method according to the invention and the exchange of messages conforming to the present invention during this method.

This Figure will be described in chronological order.

First of all, it is considered that a third entity BQ, for example a financial establishment, wishes to offer a transaction TR to a user of a second entity CL, for example a mobile telephone.

It will be assumed that, prior to the implementation of this method, the user of the second entity CL has subscribed to a service of the third entity BQ enabling him to effect electronic transactions therewith.

It will also be assumed that, at the time of subscribing to the service, the third entity BQ has sent the user of the second entity CL, for example by post, a predetermined list LS of origin addresses TPOA, the use of which will be explained later.

It will also be assumed that this predetermined list LS has also been supplied by the third entity BQ to a first entity MW serving as intermediary between the third entity BQ and the second entity CL.

Figure 1:
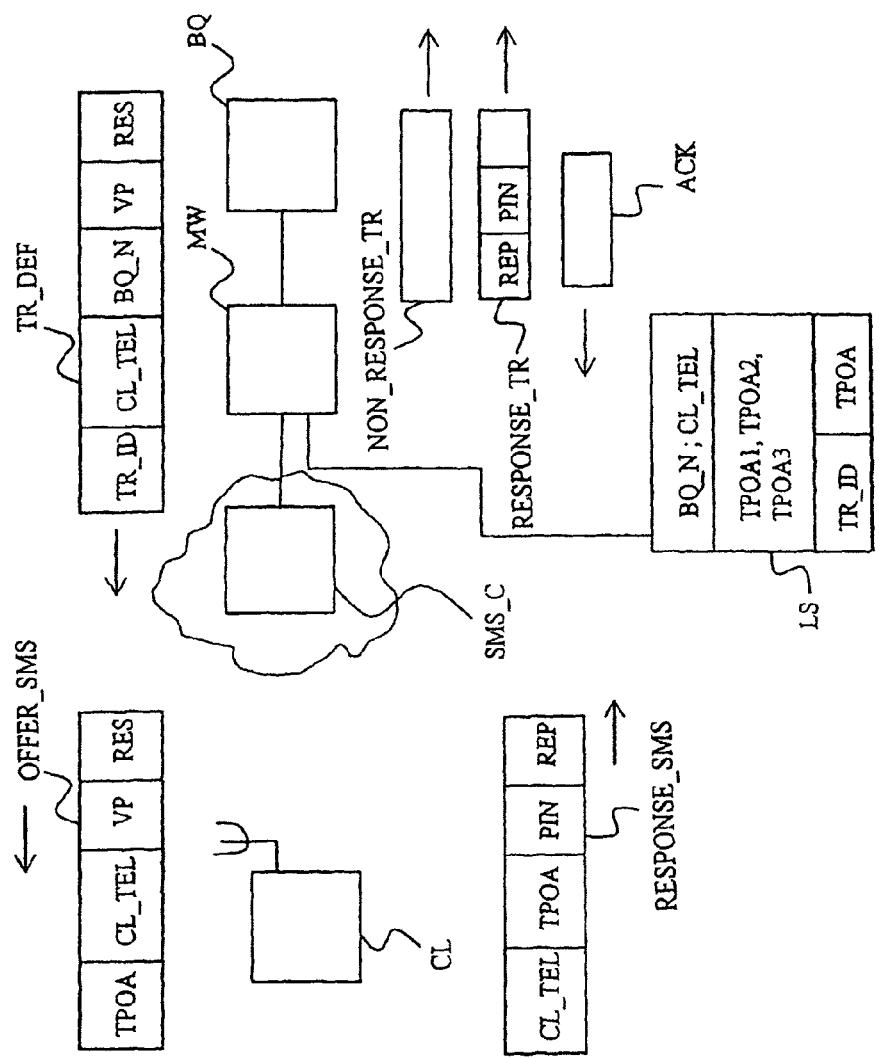
FIG. 1 represents diagrammatically the various entities for implementing the transaction method according to the invention and the messages transferred between these various entities in accordance with the present invention.

As is apparent in FIG. 1, this list LS is stored in a database connected to the first entity MW. This list LS more particularly comprises a list of origin addresses TPOA1, TPOA2, TPOA3 that can be used for an electronic transaction between the third entity BQ identified by the reference BQ_N and the user of a second entity CL identified by its telephone number CL_TEL.

If the third entity BQ wishes to submit a transaction offer to the second entity CL, the third entity BQ sends a message TR_DEF defining the transaction TR to the intermediary first entity MW.

This message TR_DEF defining the transaction TR comprises various fields, including:
  a field containing an identifier TR_ID of the transaction TR;
  a field containing the telephone number CL_TEL of the second entity CL;
  a field containing an identifier BQ_N of the first entity BQ;
  a field containing a validity period VP of the transaction; and
  a field containing a resume RES describing said transaction TR.

On receipt of the definition message TR_DEF, the intermediary first entity MW determines an origin address TPOA using at least the identifier TR_ID of the transaction TR and the identifier consisting of the telephone number CL_TEL of the second entity and/or the validity period VP of the transaction.

The origin address TPOA is preferably chosen from the predetermined list LS stored in the database as previously described.

The origin address TPOA determined in this way is reserved by the intermediary first entity MW for setting up a communication channel associated with the transaction TR.

In other words, by reserving this origin address TPOA, the first entity MW assures that no SMS message other than those used in the present transaction may contain this origin address TPOA.

This origin address TPOA will be released by the first entity MW when the third entity BQ notifies the first entity MW that the transaction has been terminated.

In a preferred embodiment, the address TPOA is determined in the list LS cyclically.

In a first variant, for example, the first entity MW selects from the list of available addresses TPOA, the latest address TPOA to be released.

In a second variant, the first entity MW selects the earliest available origin address TPOA to be reserved.

The first entity MW then constructs an offer message OFFER_SMS conforming to the SMS protocol and with the following fields:
  the origin address TPOA determined previously from the list LS,
  the telephone number CL_TEL for the destination address of the SMS message,
  the validity period VP of the transaction TR, and
  the description RES of the offered transaction TR.
  This offer message OFFER_SMS is sent to the second entity CL in accordance with the SMS protocol and via the GSM network.

It will first be assumed that the second entity CL receives the offer message OFFER_SMS.

On receiving this message, the user of the second entity CL may read on the screen of his mobile telephone a text with a header containing the origin address TPOA and followed by the description RES of the offered transaction TR.

The user of the second entity CL may therefore verify whether the origin address TPOA is a valid address by looking up this origin address TPOA in the list LS of potential addresses for a transaction of this kind.

If the origin address is valid, the user of the second entity CL has three options:
  1° to accept the transaction offer,
  2° to refuse the transaction offer explicitly, or
  3° not to respond at any time during the validity period VP of the offer.

The first two solutions are described next.

If the user of the second entity CL wishes to respond explicitly to the transaction offer, either to accept it or to refuse it, he writes a response message RESPONSE_SMS, for example using the keypad of his mobile telephone, this message containing information REP representative of acceptance or rejection of the transaction.

In a preferred embodiment, the user may also insert into the body of this message a PIN code representative of the user of the second entity CL.

This message is sent using the response function of the SMS protocol known to the person skilled in the art. This protocol is more particularly described in the GSM 03.40 standard.

In particular, this message contains:
  as the origin address, the telephone number CL_TEL of the second entity CL,
  as the destination address of the message RESPONSE_SMS, the origin address TPOA, and
  the text area comprising firstly the PIN code representative of the user of the second entity CL and secondly optional information REP representative of acceptance or rejection of the offered transaction TR.

This response message RESPONSE_SMS is transferred over the GSM network via an operator SMS_C who sends it to the intermediary first entity MW.

On receiving this response message RESPONSE_SMS, the first entity MW sends a response notification RESPONSE_TR to the third entity BQ.

In the preferred embodiment, this response notification RESPONSE_TR contains firstly the information REP representative of acceptance or rejection of the transaction by the user of the second entity CL and secondly the PIN code representative of the user of the second entity CL.

On receiving this notification RESPONSE_TR, the third entity BQ is therefore in a position to determine firstly if the user of the second entity CL is a user authorized to respond to the transaction offer and secondly, if so, the response of the user, which is obtained by reading the information REP.

The processing of this response notification RESPONSE_TR by the third entity BQ is not described in this patent application.

The steps of the data exchange method according to the invention if the user does not respond to the transaction offer during the validity period VP of said transaction TR are described next.

In this situation, if the first entity MW receives no response message RESPONSE_SMS during the validity period VP of the transaction, the first entity MW sends a non-response notification message NON-RESPONSE_TR to the third entity BQ.

It may happen that the first entity MW fails to send the transaction offer OFFER_SMS, at least temporarily, for example if the second entity CL is not in use or if the first entity MW has no SMS channels for sending the offer message OFFER_SMS.

In this case, the first entity MW is adapted to repeat the step of sending the offer message OFFER_SMS a certain number of times until the offer message is received by the second entity CL.

In a preferred embodiment, if the first entity MW fails completely to send the offer message OFFER_SMS to the second entity CL, it may send a non-sending notification message to the third entity BQ.

Be this as it may, on receiving a response notification RESPONSE_TR, a non-response notification NON-RESPONSE_TR, or a non-sending notification, the third entity BQ sends an acknowledgement message ACK to the first entity MW. On receiving this acknowledgement message ACK, the first entity MW releases the origin address TPOA reserved during the obtaining and reservation step.

This origin address TPOA may therefore be used for a new transaction.

Figure 2:
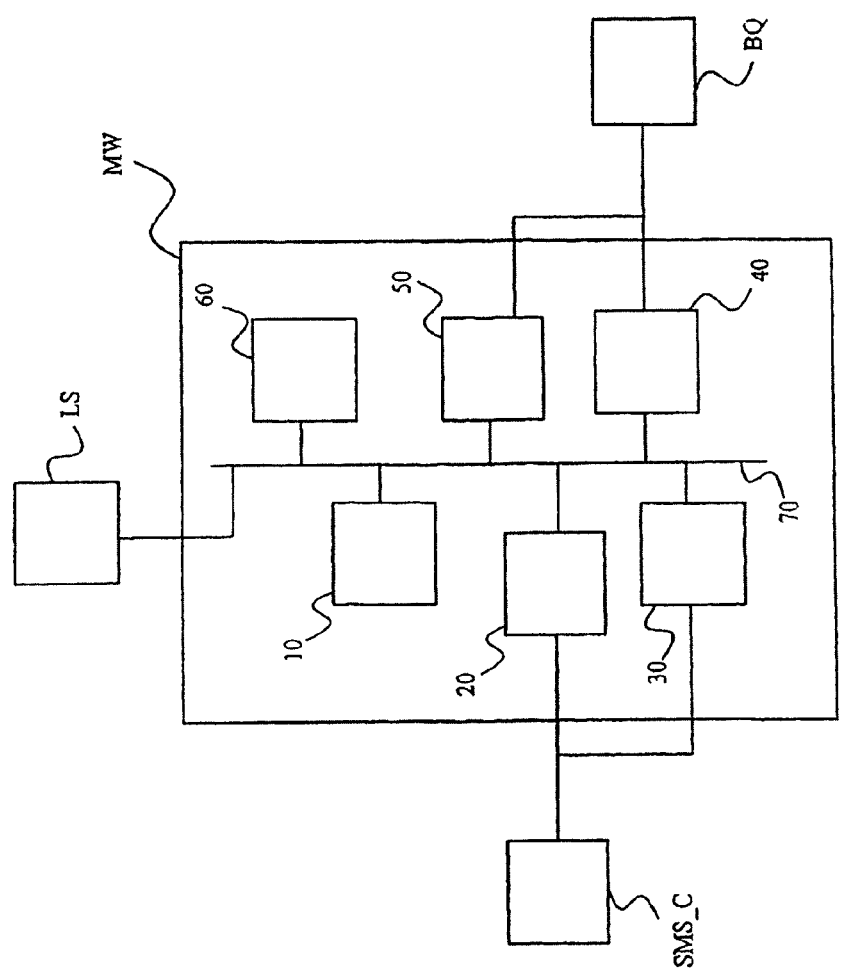
FIG. 2 represents diagrammatically an intermediary first entity for implementing a data exchange method according to the present invention.

FIG. 2 represents diagrammatically an intermediary first entity MW for implementing a data exchange method conforming to the present invention.

The first entity MW comprises means 10 for determining and reserving an origin address TPOA as previously described.

These determination and reservation means 10 are in particular adapted to choose an origin address TPOA in the predetermined list LS, preferably cyclically.

This origin address TPOA is preferably chosen by the determination and reservation means 10 as a function of the identifier TR_ID of the transaction TR, the identifier CL_TEL of the second entity CL, and the identifier BQ_N of the third entity BQ.

These parameters TR_ID, CL_TEL, BQ_N are received from the third entity BQ by means 40 for receiving a message TR_DEF defining the transaction TR. On receiving this message, the message receiver means 40 are adapted to store these parameters in the predetermined list LS.

The intermediate first entity MW also comprises means 20 for sending the second entity CL a message OFFER_SMS in accordance with the SMS protocol offering the transaction TR.

Sending messages are adapted, prior to this sending, to construct this offer message OFFER_SMS, and in particular to insert into this message the origin address TPOA reserved by the determination and reservation means 10 as briefly explained hereinabove.

When the offer message OFFER_SMS has been constructed, the sending means 20 send this message to an operator SMS_C who routes it to the second entity CL.

The intermediary first entity MW also comprises means 30 for receiving from the second entity CL a response message RESPONSE_SMS to the offer message OFFER_SMS previously described.

The receiver means 30 are adapted to supply this response message RESPONSE_SMS to means 50 for sending a response notification RESPONSE_TR to the third entity BQ.

The means 40 for receiving a message TR_DEF defining the transaction TR are further adapted to receive an acknowledgement message ACK from the third entity BQ, this message having been sent on reception of the response notification RESPONSE_TR, for example, as previously described.

The intermediary first entity MW further comprises means 60 for releasing the original address TPOA reserved by said obtaining and reservation means 10, this release being effected on receiving the acknowledgement message ACK previously described, for example.

The intermediary first entity MW finally comprises a bus 70 for interconnecting the various means previously described.

What is claimed is:

1. A method for exchanging data relating to an electronic transaction between a third entity and a second entity, comprising:
   (a) receiving at a gateway of a first entity a transaction offer message from the third entity, the transaction offer message indicative of the electronic transaction and including at least an identifier of the electronic transaction, an identifier of the third entity, and an identifier of the second entity;
   (b) performing, by a device of the first entity, one or more processing steps on at least the transaction offer message including at least creating an offer message, the offer message indicative of the electronic transaction and including at least a description of the electronic transaction, an identifier of the gateway of the first entity, and the identifier of the second entity;
   (c) dispatching the offer message to the second entity;
   (d) receiving a response message from the second entity, the response message including at least an indicator of acceptance or rejection of the electronic transaction and a Personal Identification Number (PIN) code; and
   (e) dispatching a response notification message to the third entity, the response notification message including at least aspects of the response message.

2. The method of claim 1, wherein the second entity is a mobile device.

3. The method of claim 2, wherein the identifier of the second entity is a telephone number.

4. The method of claim 1, wherein the third entity is a financial establishment.

5. The method of claim 1, wherein the identifier of the gateway of the first entity is selected by the first entity from a list of prearranged identifiers.

6. The method of claim 5, wherein the list of prearranged identifies consists of telephone numbers.

7. The method of claim 1, wherein the offer message is a Short Message Service (SMS) message.

8. The method of claim 1, wherein the response message is a SMS message.

* * * * *

UNITED STATES PATENT AND TRADEMARK OFFICE
CERTIFICATE OF CORRECTION

PATENT NO. : 8,359,242 B2  
APPLICATION NO. : 12/640597  
DATED : January 22, 2013  
INVENTOR(S) : Carles Guillot Page 1 of 1

It is certified that error appears in the above-identified patent and that said Letters Patent is hereby corrected as shown below:

On the Front Page of the Patent, Section (73) Assignee: replace "Sybase 368, Inc." with -- Sybase 365, Inc. --.

Signed and Sealed this  
Second Day of April, 2013

Teresa Stanek Rea  
*Acting Director of the United States Patent and Trademark Office*